United States Patent Office 2,858,315
Patented Oct. 28, 1958

2,858,315
NEW ISOQUINOLINES AND PROCESS FOR THEIR MANUFACTURE

Max Matter, Worb, and Albert Kobler, Guemligen, near Bern, Switzerland, assignors to Ciba Pharmaceutical Products Inc., Summit, N. J.

No Drawing. Application April 24, 1957
Serial No. 654,646

Claims priority, application Switzerland April 25, 1956

13 Claims. (Cl. 260—289)

This invention relates to new isoquinolines. More particularly, the invention concerns isoquinolines, which contain in the 1-position a hydroxyl group etherified by a polyethylene glycol containing 4–20, and preferably 7–12, ethylene radicals. These compounds may contain further substituents. Thus, they may be substituted in the isoquinoline structure, preferably by alkyl and/or alkylene, oxa-alkyl, cycloalkyl or oxa-cycloalkyl radicals containing less than 10, and more especially 4–7, carbon atoms such as, for example, ethyl, butyl, pentyl, hexyl, heptyl, cyclohexyl, butylene, etc. The ethylene radicals of the polyglycol may also be partially substituted by lower alkyl or alkoxy-alkyl radicals, such as methyl, ethyl, methoxymethyl or ethoxy-methyl groups it being of advantage that less than half of the ethylene radicals carry such substituents. The terminal hydroxyl group of the polyglycol radical is either free or etherified by a lower alkanol, such as methanol or ethanol.

The new compounds possess valuable pharmacological properties. Thus, they exhibit a pronounced anaesthetic effect, especially on the dilation receptors of the lungs. They are useful as medicaments, for example as local anesthetics or anti-coughing agents. Especially valuable are 1-R-isoquinolines carrying in the isoquinoline nucleus an alkyl, alkylene, oxaalkyl, cycloalkyl or oxacycloalkyl radical containing less than 10 carbon atoms, wherein R stands for a hydroxyl group etherified with a polyethyleneglycol with 7–12 ethylene radicals, or its mono-lower alkyl-ether, less than half of the ethylene radicals of which may be substituted by methyl, ethyl or ethoxy methyl radicals. Very active compounds are the nonaethylene glycol methyl ether (3-n-butyl-isoquinolyl-(1)-ether) of the formula

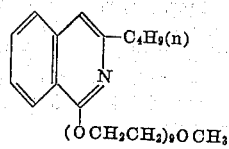

and the octaethylene glycol-mono-3-n-butyl-isoquinolyl-(1)-ether of the formula

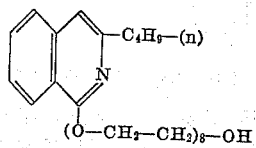

The new compounds are obtained by reacting at a temperature above 90° C. a 1-chloro-isoquinoline with a polyethylene glycol containing 4–20 ethylene radicals or a monoalkyl ether thereof, preferably in the form of a metal salt, such as the sodium salt thereof.

When, in this process, a mixture of different polyethyleneglycols having different chain lengths n or derivatives thereof is used as starting material, there is obtained a mixture of polyethylene glycol ethers in which n has an average value. The invention also includes the production of such mixtures. Such ether mixtures can be purified and split up into their components by the usual methods.

In a specific embodiment of the invention 1-chloro-3-n-butyl-isoquinoline is reacted with the sodium salt of nonaethylene glycol monomethyl ether at about 110° C., nonaethylene glycol monomethyl ether being used as a diluent.

It is noteworthy that the new compounds are more or less soluble or emulsifiable in water. The solubility increases with an increase in the length of the polyglycol residue. A solution of such a compound has the characteristic property of becoming turbid when heated to a temperature which is dependent on the concentration. This temperature in the case of a solution of 10 percent strength is called the turbidity point, and is a physical constant for the compound. The turbidity is reversible, so that on being cooled the solution again becomes clear.

The compounds used as starting materials are known or can be made by customary methods.

The new compounds can be used as medicaments, for example, in the form of pharmaceutical preparations, which contain the compounds in admixture with a pharmaceutical organic or inorganic carrier suitable for oral, enteral, parenteral or topical administration. For making the carrier there are used substances which do not react with the new compounds, for example, water, gelatine, lactose, starches, magnesium stearate, talc, vegetable oils, benzyl alcohols, gums, polyalkylene glycols, white petroleum jelly, cholesterol or another known carrier for medicaments. The pharmaceutical preparations may be made up, for example, as tablets, dragees, salves, creams or in liquid form as solutions, suspensions or emulsions. If desired, they may be sterilised and/or may contain auxiliary substances, such as preserving, stabilising, wetting or emulsifying agents, salts for regulating the osmotic pressure or buffers. They may also contain another therapeutically valuable substance. The preparations are made by the usual methods.

The following examples illustrate the invention:

Example 1

0.5 gram of sodium is dissolved in 20 grams of nonaethyleneglycol monomethyl ether dissolution being carried out at 130° C. under nitrogen and with the exclusion of moisture, while stirring. 4.4 grams of 1-chloro-3-n-butyl-isoquinoline are then introduced dropwise, while stirring, in the course of 10 minutes at a bath temperature of 110° C., and then the whole is stirred at 100° C. for a further 2 hours. The mixture is allowed to stand overnight at 100° C. without stirring, and, after being cooled, 50 cc. of benzene and 20 cc. of water are added. After vigorous agitation, the mixture separates into two layers. The benzene layer is washed with 20 cc. of a 1 N=aqueous solution of caustic soda. The two liquid phases are each extracted twice with 25 cc. of benzene on each occasion. The benzene solution contains the nonaethylene glycol methyl ether (3-n-butyl-isoquinolyl-(1)-ether) of the formula

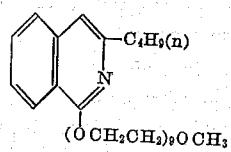

In order to free the product from impurities it is extracted by treating the benzene solution with 2 N-aqueous hydrochloric acid. By rendering the solution alkaline with a 10 N-aqueous solution of caustic soda, extracting three times with benzene and evaporating the combined benzene extracts under reduced pressure, there are obtained 11 grams of a crude product which, for further purification, is distilled under 0.01 mm. pressure at 215° C. to yield a colourless thickly liquid oil which becomes slightly opalescent at room temperature. It is readily soluble at room temperature in water and most organic solvents, and separates out from aqueous solution of 10 percent strength in an oily form when heated at 44° C. The nonethylenglycol monomethyl ether used as starting material can be obtained as follows:

43.5 grams of hexaethylene glycol-monomethyl ether (cf. Example 2) are dissolved in 75 cc. of benzene and mixed at a constant rate in the course of 30 minutes with 13 grams of pulverized sodium hydroxide and, simultaneously 30 cc. of benzene sulfochloride at 25–30° C. with stirring and occasional cooling. Finally, the temperature is allowed to rise to 35–40° C. and stirring continued for 2 hours. The reaction mass is allowed to stand overnight. It then still has a distinct alkaline reaction. It is mixed, while stirring, with 60 cc. of water, whereupon all substances pass into solution, and two layers are formed. The aqueous layer is extracted once more by agitation with 20 cc. of benzene. The two benzene extracts are combined and agitated for 4 hours with 10 cc. of 25% aqueous ammonia and then mixed with 20 cc. of 2 N-caustic soda solution. The whole is agitated again and the benzene layer separated and washed twice with 20 cc. of 2 N-caustic soda solution and 20 cc. of water. Each aqueous layer is separately extracted with the same 20 cc. of benzene. By drying and evaporating the benzene solutions under a vacuum produced by a water jet pump there are obtained 62 grams of slightly brownish colored oily benzene sulfonic acid ester of hexaethylene glycol-mono-methyl ether. In the course of 1 hour, at 100° C. with stirring and with the exclusion of moisture and oxygen, this ester is run into a solution, prepared at 100–110° C. of 3.5 grams of sodium in 80 cc. of dry triethylene glycol. Stirring is continued for 1 hour and the reaction mass allowed to stand at 100° C. overnight.

The reaction mass, after it has cooled, is mixed with 40 cc. of water and 150 cc. of chloroform, and mechanically agitated. The separated aqueous layer is extracted four times by agitation, each time with 40 cc. of chloroform, and the chloroform extracts are washed successively 3 times, each time with 20 cc. of water.

The combined chloroform solutions are dried. On careful evaporation they yield 59 grams of crude nonaethylene-glycol-mono-methyl-ether which can be freed from any hydrolyzable and ionic impurities that may still be present by treatment with alkali alcoholate on the water bath and subsequent de-ionization of the aqueous solution in a mixed bed of ion exchangers.

If the reaction mixture is dissolved in twice its quantity of water, and the solution shaken with a small quantity of benzene before it is extracted with chloroform, there can be removed already at this point the less readily water-soluble and in part brown-colored impurities.

Distillation in a high vacuum yields, apart from 3 grams of triethylene glycol as forerunnings, and 5.5 grams of residue, at 178–183° C. under a pressure of 0.01 mm. 50 grams of nonaethylene glycol-mono-methyl ether in the form of a colorless oil. When distilled again the oil boils at 170° C. under a pressure of 0.01 mm. The nonaethylene glycol monoethyl ether can be obtained in the same manner.

*Example 2*

0.5 gram of sodium is dissolved in the course of 90 minutes in 12 grams of hexaethylene glycol monomethyl ether the dissolution being carried out at 120° C. in an atmosphere of nitrogen and with the exclusion of moisture, while stirring. In the course of 10 minutes 3.85 grams of 1-chloro-3-ethyl-isoquinoline are then introduced dropwise at a bath temperature of 100° C., while stirring, and stirring is then continued for a further 2 hours, at 100° C. After maintaining the mixture at 100° C. overnight, it is cooled to room temperature and mixed with 50 cc. of benzene and 20 cc. of water and the whole is vigorously agitated. By working up in the manner described in Example 1, there are obtained three benzene extracts which contain hexaethylene glycol methyl ether-(3-ethyl-isoquinolyl-(1)-ether) of the formula

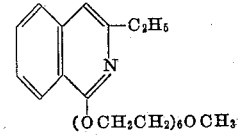

By further purification in a manner analogous to that described in Example 1 there are obtained 9 grams of a crude product, which is distilled under 0.01 mm. pressure at 178° C. to yield a colourless thickly liquid oil. It is readily soluble in water below 20° C. and in most organic solvents, and separates out in an oily form from an aqueous solution of 10 percent strength when the latter is heated at 22° C. The hexaethylene glycol monomethyl ether used as starting material can be obtained as follows:

33 grams of triethylene glycol-mono-methyl ether are dissolved in 100 cc. of benzene and reacted as described in Example 1 in connection with the benzene-sulfonic acid ester of hexaethylene glycol-mono-methyl ether with 16 grams of sodium hydroxide and 36 cc. of benzene sulfochloride to obtain 55 grams of the nearly colorless oily benzene-sulfonic acid ester which is then caused to act on a solution of 4.6 grams of sodium in 100 cc. of triethylene glycol in the manner described for the benzene-sulfonic acid ester of hexaethylene glycol-monomethyl ether in Example 1. On working up in an analogous manner there are obtained 59 grams of a crude product which, when distilled in a high vacuum yields, apart from 7.5 grams of triethylene glycol as forerunnings, 3.5 grams of nonaethylene glycol-dimethyl ether as the second running, and 1 gram of a residue, at a pressure of 0.01 mm. and at 125–130° C., 44 grams of hexaethylene glycol-mono-methyl ether in the form of a colorless oil which, when distilled again, boils at 125° C. at a pressure of 0.01 mm.

*Example 3*

In an atmosphere of nitrogen, 5 grams of 1-chloro-3-n-hexyl-isoquinoline, which distils at 95° C. under a pressure of 0.01 mm., are added dropwise in the course of 15 minutes, while stirring and with the exclusion of moisture, at a bath temperature of 110° C., to a solution of 0.5 gram of sodium in 25 grams of nonaethylene glycol monomethyl ether. Stirring is then continued for 2 hours. The reaction mixture is allowed to stand overnight at 100° C. and worked up as described in Example 1. From the benzene extracts there is obtained the nonaethyleneglycol methyl ether-(3-n-hexyl-isoquinolyl-(1)-ether) of the formula

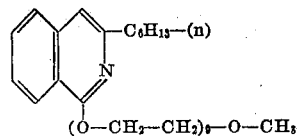

On further purification analogous to that in Example 1 there are obtained 12.8 grams of a crude product in the form of a nearly colorless oil which distils at 230° C. and a pressure of 0.01 mm. to yield a colorless viscous oil. At room temperature it is readily soluble in water and most organic solvents. When a 10% aqueous solution of the product is heated to 38° C., the product separates out in the form of an oil.

*Example 4*

In an atmosphere of nitrogen, 4.4 grams of 1-chloro-4-n-butyl-isoquinoline boiling at 92° C. under a pressure of 0.01 mm. are added dropwise in the course of a quarter of an hour at a bath temperature of 100–110° C. while stirring and with the exclusion of moisture, to a solution of 0.5 gram of sodium in 25 grams of nonaethyleneglcol monomethyl ether. After completion of the exothermic reaction stirring is continued for 2 hours. The reaction mass is then allowed to stand overnight in the bath having a temperature of 100° C.

On working up in a manner analogous to that of Example 1 there are obtained 11.7 grams of crude nonaethyleneglycol methyl ether-(4-n-butyl-isoquinolyl-(1)-ether) of the formula

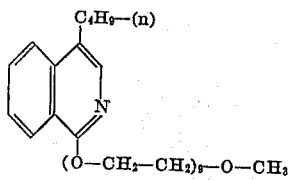

By further purification a nearly colorless product is obtained which at 230° C. and under a pressure of 0.01 mm. distils to yield a colorless viscous oil. At room temperature it is soluble in water and most organic solvents. When a 10% aqueous solution of the product is heated to 51° C. the product separates out in the form of an oil.

*Example 5*

5 grams of 1-chloro-4-cyclohexyl-isoquinoline of melting point 52° C. are added in the course of 15 minutes, while stirring at a bath temperature of 110° C., and with exclusion of moisture and oxygen, to a solution of 0.5 gram of sodium in 25 grams of nonaethylene glycol-mono-methyl ether. When the exothermic reaction has subsided, stirring is continued for 6 hours at 110–120° C. The reaction mass is allowed to cool overnight and then worked up in a manner analogous to that of Example 1. There are obtained from the benzene extracts 12.50 grams of nonaethylene glycol-methyl ether-(4-cyclohexyl-isoquinolyl-(1)-ether) of the formula

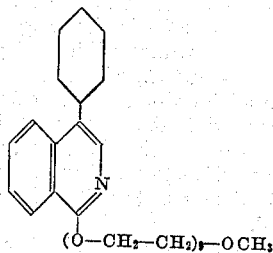

as a nearly colorless oil.

An aqueous solution thereof is treated with active carbon and then extracted with benzene to obtain a colorless oil which is freed from the more volatile portions under a high vacuum at 250° C. At room temperature the colorless viscous oil is readily soluble in water and most organic solvents and it separates out as an oil when its 10% aqueous solution is heated to 51° C.

*Example 6*

From 20 grams of octaethylene glycol and 4.4 grams of 1-chloro-3-n-butyl-isoquinoline there are obtained according to the procedure of Example 1 after an overall reaction time of 5 hours, 10.7 grams of crude octaethylene glycol-mono-3-n-butyl-isoquinolyl-(1)-ether of the formula

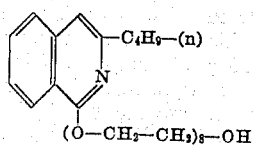

For purification and removal of a small proportion of diether, the nearly colorless oil is dissolved in a large amount of water and treated with active carbon. From the colorless aqueous solution there are obtained by repeated extraction with small portions of ether a total of ten extracts in the form of diminishing quantities of a colorless oil. The first extracts contain little diether and if 10% aqueous solutions thereof are heated, the oil separates out at temperatures below 50° C. The later extracts yield a pure compound in the form of a colorless oil which is readily soluble at room temperature in water and most organic solvents. From a 10% aqueous solution it separates in milky state when heated to 50° C. To remove completely all portions that are more readily volatile, the product is degassed under a high vacuum at 175° C.

The octaethylene glycol used as starting material can be prepared as follows:

200 parts by volume of diethylene glycol are dissolved in 1800 parts by volume of benzene and mixed, while stirring energetically and cooling, in the course of one hour at 30–35° C. simultaneously with 800 parts by volume of benzene sulphochloride and 400 parts of pulverized sodium hydroxide. The whole is stirred for a further 30 hours and then allowed to stand for one day. By stirring in 2500 parts by volume of water, the salt which crystallises out and the excess of sodium hydroxide is dissolved, and the aqueous solution is extracted with 200 parts by volume of benzene. The purified benzene extract is mixed with 100 parts by volume of an aqueous ammonia solution of 25 percent strength and agitated for 4 hours on the machine. Finally, the mixture is again agitated for a short time with 200 parts by volume of an aqueous solution of caustic soda of 10 percent strength. The aqueous portions are separated, the benzene solution is washed with 100 part by volume of caustic soda solution of 10 percent strength and then with 100 parts by volume of water, and all the aqueous portions are extracted in succession with 200 parts by volume of benzene. By evaporating the combined and dried benzene extracts there are obtained 770 parts of crude ester in the form of a slightly brownish coloured oil, which crystallises from 10,000 parts by volume of methyl alcohol. There are obtained 735 parts of diethylene glycol dibenzene sulphonate melting at 35° C.

195 parts of the diester so obtained in 25 parts by volume of anhydrous ether are introduced dropwise in the course of 4 hours at 100–110° C., while stirring well and with the exclusion of moisture, into a solution of 26 parts of sodium in 400 parts by volume of triethylene glycol. The whole is stirred for a further 6 hours, and then allowed to stand for 10 hours at 100–110° C. without stirring. By exhaustive extraction with ether in an apparatus working in a continuous manner there are obtained 460 parts of an almost colourless oil, which is allowed to stand overnight with 100 parts by volume of ammonia solution of 25 percent strength. The whole is then evaporated, taken up in 225 parts by volume of water and allowed to run through a column of a mixed bed of Amberlite IR 120 and IRA 410 in order to remove ionogenic constituents. By evaporating the elutriate under reduced pressure produced by a water jet pump there are obtained 446 parts of an almost colourless oil. By distillation under a high vacuum there are obtained, in addition to 315 parts of an excess of triethylene glycol, 100 parts of octaethylene glycol boiling at 175° C. under 0.01 pressure in the form of a colourless oil and 30 parts of a residue which solidifies in a waxlike form.

*Example 7*

75 grams of commercial polyethylene glycolmonomethyl ether having an average molecular weight of 750, 17.4 grams of 1,2-propylene oxide and 0.1 gram of pulverized potassium hydroxide are heated to 150–160° C. in an atmosphere of nitrogen in an autoclave equipped with a stirrer. After a short while the initial superatmospheric pressure disappears and stirring is continued for half an hour at 155–160° C. The contents of the vessel, after being dried at 100° C. under a vacuum produced by a water jet pump weighs 91.5 grams. A 10% aqueous solution is prepared from the pale brownish colored oil, filtered with active carbon, and exhaustively extracted with chloroform. The nearly colorless oil obtained on evaporation of the chloroform solution represents the ether of the formula

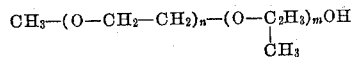

$$CH_3-(O-CH_2-CH_2)_n-(O-C_2H_3)_mOH$$
$$\quad\quad\quad\quad\quad\quad\quad\quad\quad\quad |$$
$$\quad\quad\quad\quad\quad\quad\quad\quad\quad\quad CH_3$$

wherein $n$ represents an average value of 16 and $m$ an average value of 3. When allowed to stand, it solidifies to form a wax-like mass. The hydroxyl determination indicates an average molecular weight of 895.

30 grams of this polyether are melted and mixed, at room temperature, while stirring and with the exclusion of moisture, with 0.5 gram of a 54% sodium hydride dispersion in mineral oil. After 2 hours the evolution of hydrogen ceases. While stirring at 110° C. there are added in the course of 5 minutes 2.65 grams of 1-chloro-4-n-heptyl-isoquinoline. When the exothermic reaction has subsided, stirring is continued for 2 hours at 110° C. On working up in the manner described in Example 1 there are obtained 11.5 grams of the polyether of the formula

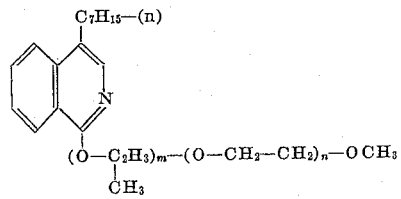

wherein $m$ and $n$ have the meanings given above, in the form of a nearly colorless oil the aqueous solution of which is opal colored and turbid.

To remove the difficultly water-soluble portions and other impurities, a 10% aqueous solution of the crude product is treated with active carbon and the filtrate extracted twice by shaking with some ether. Only small quantities of water-soluble portions are thus extracted, whereas the isoquinolyl ether can be separated from the water only by exhaustive extraction with benzene after admixing a saturated sodium chloride solution. It is a colorless oil which is easily soluble in cold water and most organic solvents. When allowed to stand it solidifies into a wax-like mass.

*Example 8*

By reacting 2.35 grams of 1-chloro-7-n-pentyl-isoquinoline with a solution of 0.5 gram of a sodium hydride dispersion in 30 grams of nona-ethyleneglycolethyl ether-(2-hydroxy-3-ethoxy-propyl - (1) - ether) as described in Example 7 there is obtained a good yield of the poly ether of the formula

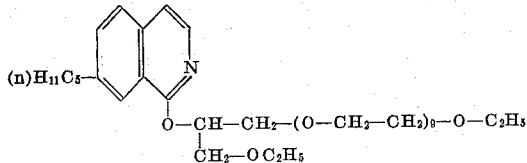

in the form of a colorless oil which readily dissolves in cold water and most organic solvents.

The nonaethyleneglycol - ethyl ether - (2-hydroxy-3-ethoxy-propyl-(1)-ether) can be obtained by reacting the benzenesulfonic acid ester of nonaethyleneglycolmonoethyl ether with an equimolecular quantity of the monosodium compound of glycerine-α-monoethyl ether at 100° C. and subsequent distribution between chloroform and water. It is a colorless oil which distils at 220° C. under a pressure of 0.01 mm.

*Example 9*

In the manner described in Example 5, 1 g. of 1-chloro-3,4-tetramethylene-isoquinoline of melting point 69° C. is added to a solution of 0.12 g. of sodium in 7 g. of nonaethylene glycol monomethyl ether. When the exothermic reaction has subsided the reaction mass is stirred for 6 hours at 100° C. On working up in a manner analogous to that described in Example 1 there are obtained from the benzene extracts 2.65 g. of the nonaethylene glycol methyl ether-(3,4-tetramethylene-isoquinolyl-(1)-ether) of the formula

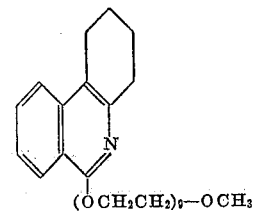

in the form of a nearly colorless oil. Its 1% aqueous solution is treated with active carbon and then distils at 250° C. under a pressure of 0.01 mm. to form a colorless viscous oil. It is easily soluble at room temperature in water and most organic solvents. When its 10% aqueous solution is heated the oil separates out again at 51° C.

The 1-chloro-3-(n)-hexyl-isoquinoline used as starting material in Example 3 is obtained from 38.5 g. of 3-(n)-hexyl-1,2-dihydro-isoquinolone-(1) by boiling it for 24 hours under reflux in 50 cc. of phosphorus oxychloride. The resulting reaction mixture is poured on to ice and neutralized with caustic soda solution of 40 percent strength. By extraction with benzene and washing the extracts neutral there are obtained 42 g. of the crude 1-chloro derivative of which 39 g. distil at 95° C. under a pressure of 0.01 mm. to form a colorless oil.

The 1-chloro-4-(n)-butyl-isoquinoline used as starting material in Example 4 can be obtained in this manner: 11.5 g. of sodium are dissolved in 300 cc. of liquid ammonia in the presence of a ferric nitrate crystal and mixed dropwise under moisture seal, while being stirred and cooled in a bath of −80° C., with 58.5 g. of benzyl cyanide. After the addition of 300 cc. of dry toluene the ammonia is evaporated, in the final stage with heating on the water bath. While cooling in a water bath, 123 g. of n-butyl-benzene-sulfonate are then added dropwise in the course of 30 minutes at 80° C. Finally, 100 cc. of toluene are added.

The cooled reaction mixture is mixed with 300 cc. of water and extracted with benzene. The extracts are washed neutral with water and evaporated to give 110 g. of a crude product from which there are obtained by distillation at 135–141° C. under a vacuum produced by a wet jet pump 26 g. of forerunnings and 48.5 of a colorless oil. The benzyl cyanide still present in the latter can be separated by conversion into α,β-diphenylacrylonitrile by subjecting it for several days to the action of 14 g. of benzaldehyde and 25 g. of sodium methanolate in 100 cc. of dry methanol. The nitrile is mixed with water and taken up in ether together with the other components of the mixture. The benzaldehyde, which is alo extracted, is removed from the ethereal solution by shaking with 30% aqueous sodium bisulfite solution. When the residue obtained on evaporation of the ether is allowed to stand 5 g. of solid α,β-diphenylacrylonitrile separate which are filtered off with suction and washed with methanol. On distillation under a vacuum produced by a water jet pump 33 g. of pure α-phenylcapronitrile pass over at 135° C. under a pressure of 12 mm.

26.5 g. of this nitrile are catalytically hydrogenated in 120 cc. of 10 N-methanolic ammonia solution in the presence of 2 g. of Raney nickel in an autoclave equipped with a stirrer at 120° C. and under a pressure of hydrogen of 150 atmospheres. The amine is then purified by way of the hydrochloride which is soluble in 2 N-hydrochloric acid, and 23 g. of a crude product and 2 g. of a neutral substance obtained. From the crude product 20 g. of a colorless oil distil at 50° C. under a pressure of 0.5 mm. The picrolonate of the resulting 2-phenyl-(n)-hexylamine-(1) melts at 188–190° C.

59.6 g. of amine in 300 cc. of dry toluene are treated, while stirring and excluding moisture, with hydrogen chloride gas until the saturation point is attained. The hydrochloride which first separates passes into solution again. 190 g. of phosgene are then introduced while stirring at 135° C. in the course of 5 hours until the evolution of hydrogen chloride gas ceases. After the evaporation of the toluene under a vacuum produced by a water jet pump the residue is mixed with 150 cc. of carbon tetrachloride and the mixture boiled under reflux for 2 hours. After the evaporation of the carbon tetrachloride there are obtained by distillation under a vacuum produced by a water jet pump 64 g. of 2-phenyl-(n)-hexylisocyanate-(1) in the form of a colorless oil which passe over at 140° C. under a pressure of 12 mm. The oil is dissolved in 100 cc. of nitrobenzene and the solution added dropwise in the course of 1 hours to 90 g. of aluminum chloride in 150 cc. of nitrobenzene while stirring and under moisture seal, the temperature varying between 50 and 60° C. Stirring is continued at 75° C. for 2 hours, the reaction mixture is poured on to ice, and extracted exhaustively with chloroform. The extracts are washed with aqueous hydrochloric acid and water and the chloroform evaporated first under a vacuum produced by a water jet pump then under a high vacuum, after which the extracts are subjected to fractional distillation. After the forerunnings consisting of nitrobenzene there are obtained at 135–145° C. under a pressure of 0.01 mm. 60 g. of a viscous faintly yellowish oily distillate. The 4-(n)-butyl-1,2,3,4-tetrahydro-isoquinolone-(1) so obtained solidifies on standing and after recrystallization from benzine it melts at 70° C.

13.8 g. of this product are mixed with 2 g. of 10% palladium charcoal and dehydrated by passing a fine stream of nitrogen through the mixture while heating at 215° C. for 30 hours. The solidified melt is comminuted and extracted with methanol, then separated from the catalyst by filtering with suction. By recrystallizing the crude product from a 1:1-mixture of ethanol and water and from benzene there are obtained 9 g. of 4-(n)-butyl-1,2-dihydro-isoquinolone-(1) which is reacted in the manner indicated for 1-chloro-3-(n)-hexyl-isoquinoline using the same molecular proportions to form 1-chloro-4-(n)-butyl-isoquinoline.

By using in this synthesis instead of the α-phenylcapronitrile the α-cyclohexyl-phenylacetonitrile there is obtained with the same molecular proportions first the 2-phenyl-2-cyclohexyl-ethylamine-(1) of boiling point 156° C. at 11 mm. pressure. From this substance there is obtained with the aid of phosgene the 2-phenyl-2-cyclohexyl-ethyl-isocyanate-(1) of boiling point 179° C. under 12 mm. pressure which product on ring closure gives a good yield of 4-cyclohexyl-1,2,3,4-tetrahydro-isoquinolone-(1) of melting point 165° C. (after crystallization from cyclohexane). Purification is carried out advantageously by recrystallization after treatment with active carbon, first from methanol, and then from benzene and cyclohexane. Dehydrogenation then yields the 4-cyclohexyl-1,2-dihydro-isoquinolone-(1) which after conversion melts at 173° C. with partial liquefaction; it recrystallizes again at 186° C. By subjecting it to the action of phosphorus oxychloride there can be obtained a nearly quantitative yield of the 1-chloro-4-cyclohexyl-isoquinoline melting at 52° C. (after crystallization from petroleum ether) which is used as starting material in Example 5.

By an analogous method the 1-chloro-4-(n)-heptyl-isoquinoline used in Example 7 can be prepared.

To obtain the 1-chloro-3,4-tetramethylene-isoquinoline used as starting material in Example 9, the 2-phenyl-cyclo- hexylamine is used. With the same molecular ratios as described above in connection with the 2-phenyl-(n)-hexylamine-(1) there is obtained first the 2-phenyl-cyclohexyl-isocyanate boiling at 68° C. under a pressure of 0.02 mm. On ring closure brought about by the action of aluminum chloride there is obtained the 3,4-tetramethylene-1,2,3,4-tetrahydro-isoquinolone-(1) of melting point 165–185° C. (after crystallization from methanol) in a 75% yield. The product is dehydrogenated and there is obtained apart from unchanged portions a mixture of substances dehydrogenated in varying degrees which can be separated by chromatography over alumina of activity I using as eluating agents benzene, ether and chloroform. The 3,4-tetramethylene-1,2-dihydro-isoquinolone-(1) of melting point 246–247° C. (after crystallization from benzene) is in the ether eluates. With phosphorus oxychloride there is obtained therefrom the 1-chloro-3,4-tetramethylene-isoquinoline of melting point 69° C. (after crystallization from petroleum ether) which can be purified if necessary by dissolving the substance in petroleum ether and chromatographing it over alumina of activity I. The petroleum ether eluates contain the pure 1-chloro compound.

The starting material used in Example 8 can be obtained from n-pentyl-benzene by reaction with formaldehyde and hydrochloric acid, reacting the resulting p-n-pentyl-benzyl chloride with potassium cyanide, reducing the p-n-pentyl-benzyl-cyanide formed with Raney nickel in the presence of ammonia, reacting the resulting p-n-pentyl-phenylethylamine with phosgene and hydrochloric acid to form the corresponding isocyanate, effecting ring closure with aluminum chloride in nitrobenzene, dehydrogenating the resulting tetrahydro-7-n-pentyl-isoquinolone-(1) with phosphorus oxychloride to form the 1-chloro-7-n-pentyl-isoquinoline.

What is claimed is:

1. A member selected from the group consisting of 1-OR-isoquinoline and 1-OR-isoquinoline substituted by members selected from the group consisting of alkyl, oxaalkyl, cycloalkyl and oxacycloalkyl radicals, said radicals containing at most 9 carbon atoms, the substituent R in said isoquinolines representing the radical of a polyethylene glycol with 4-20 ethylene radicals, said polyethylene glycol radical having at the terminal oxygen atom a member selected from the group consisting of hydrogen and lower alkyl.

2. A compound of the formula:

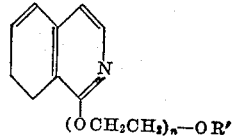

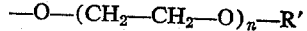

wherein R' stands for a lower alkyl radical and $n$ represents an integer from 7–12.

3. A compound of the formula:

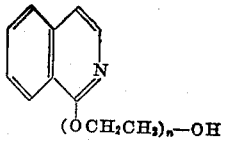

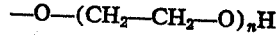

wherein $n$ represents an integer from 7–12.

4. 1-R-isoquinoline wherein R represents a radical of the formula

—O—(CH$_2$—CH$_2$—O)$_n$—R' in which R' stands for a lower alkyl radical and $n$ represents an integer from 7 to 12, said isoquinoline being substituted in the isoquinoline nucleus by a cycloalkyl radical containing at most 9 carbon atoms.

5. 1-R-isoquinoline wherein R stands for a radical of the formula

—O—(CH$_2$—CH$_2$—O)$_n$H in which $n$ represents an integer from 7 to 12, said isoquinoline being substituted in the isoquinoline nucleus by an alkyl radical containing at most 9 carbon atoms.

6. 1-R-isoquinoline wherein R stands for a radical of the formula $$-O-(CH_2-CH_2-O)_nH$$

in which n represents an integer from 7 to 12, said isoquinoline being substituted in the isoquinoline nucleus by a cycloalkyl radical containing at most 9 carbon atoms.

7. 1-R-isoquinoline wherein R represents a radical of the formula $$-O-(CH_2-CH_2-O)_n-R'$$

in which R' stands for a lower alkyl radical and n represents an integer from 7 to 12, said isoquinoline being substituted in the isoquinoline nucleus by an alkyl radical containing at most 9 carbon atoms.

8. The isoquinoline of the formula

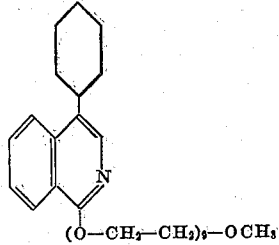

9. The isoquinoline of the formula

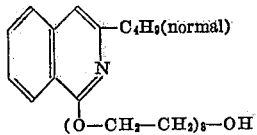

10. The isoquinoline of the formula

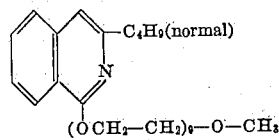

11. The isoquinoline of the formula

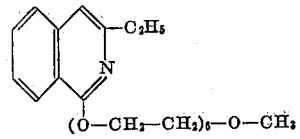

12. The isoquinoline of the formula

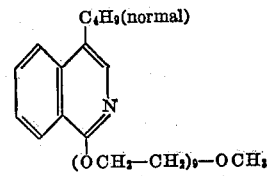

13. The isoquinoline of the formula

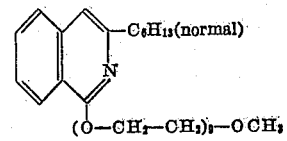

References Cited in the file of this patent
UNITED STATES PATENTS
2,800,487   Mark _____ July 23, 1957

UNITED STATES PATENT OFFICE

CERTIFICATE OF CORRECTION

Patent No. 2,858,315 October 28, 1958

Max Matter et al.

It is hereby certified that error appears in the printed specification of the above numbered patent requiring correction and that the said Letters Patent should read as corrected below.

Column 2, line 56, for "N=aqueous" read -- N-aqueous --; column 3, line 32, for "62 grams" read -- 60 grams --; column 9, line 5, for "0.5 mm." read -- 0.05 mm. --.

Signed and sealed this 17th day of February 1959.

(SEAL)
Attest:
KARL H. AXLINE
Attesting Officer

ROBERT C. WATSON
Commissioner of Patents